United States Patent
Kurata et al.

(10) Patent No.: US 10,254,141 B2
(45) Date of Patent: Apr. 9, 2019

(54) THERMAL TYPE FLOW SENSOR

(71) Applicant: SMC CORPORATION, Chiyoda-ku (JP)

(72) Inventors: Toshinori Kurata, Tsukubamirai (JP); Katsuya Morozumi, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 94 days.

(21) Appl. No.: 15/019,612

(22) Filed: Feb. 9, 2016

(65) Prior Publication Data

US 2016/0238421 A1   Aug. 18, 2016

(30) Foreign Application Priority Data

Feb. 18, 2015 (JP) .................. 2015-029171

(51) Int. Cl.
*G01F 1/684* (2006.01)
*G01F 5/00* (2006.01)

(52) U.S. Cl.
CPC ............ *G01F 1/684* (2013.01); *G01F 1/6842* (2013.01); *G01F 5/00* (2013.01)

(58) Field of Classification Search
CPC .......... G01F 1/6842; G01F 1/68; G01F 1/684
See application file for complete search history.

(56) References Cited

U.S. PATENT DOCUMENTS

| | | | | |
|---|---|---|---|---|
| 3,147,618 A * | 9/1964 | Benson | ................ | G01F 1/3272 73/204.21 |
| 3,425,277 A * | 2/1969 | Adams | .................... | G01F 1/684 73/202 |
| 4,083,244 A * | 4/1978 | Agar | ....................... | G01F 1/684 73/204.18 |
| 4,433,576 A * | 2/1984 | Shih | ........................ | G01F 1/684 73/204.21 |
| 7,555,945 B2 * | 7/2009 | Naguib | ..................... | 73/204.27 |

FOREIGN PATENT DOCUMENTS

JP         6-80130 U     11/1994

* cited by examiner

*Primary Examiner* — Justin N Olamit
(74) *Attorney, Agent, or Firm* — Oblon, McClelland, Maier & Neustadt, L.L.P.

(57) ABSTRACT

A measurement flow path is formed in a detector that makes up a thermal type flow sensor. A temperature sensor is disposed on an upstream side, and a heater is disposed on a downstream side in a fluid flow direction of the measurement flow path. Furthermore, a heat transfer preventing wall is disposed between the temperature sensor and the heater. Preferably, a rectifying means such as an orifice or the like is disposed on the downstream side of the heat transfer preventing wall, and between the temperature sensor and the heater.

4 Claims, 11 Drawing Sheets

THERMAL TYPE FLOW SENSOR

CROSS-REFERENCE TO RELATED APPLICATION

This application is based upon and claims the benefit of priority from Japanese Patent Application No. 2015-029171 filed on Feb. 18, 2015, the contents of which are incorporated herein by reference.

BACKGROUND OF THE INVENTION

Field of the Invention

The present invention relates to a thermal type flow sensor having a temperature sensor, which is arranged on an upstream side of a flow path through which a fluid flows, and a heating element disposed on a downstream side of the flow path.

Description of the Related Art

With a thermal type of flow sensor, a temperature sensor is disposed on an upstream side of a flow path through which a fluid flows, and a heater (heating element) is disposed on a downstream side of the flow path. In addition, the fluid is heated by the heater, whereas based on the temperature of the fluid as measured by the temperature sensor, a flow velocity or a flow rate of the fluid is detected.

This type of thermal sensor is used in a condition of being attached to a body or the like so that the flow path extends along a horizontal direction. Therefore, the fluid flows in a horizontal direction.

When the installation space is too narrow to orient the flow path in a horizontal direction, depending on the circumstances, it is inevitable that the thermal type flow sensor will have to be used in a posture such that the flow path extends along a vertical direction. However, when the temperature sensor is positioned at an upward location and the heater is positioned at a downward location, in the fluid, which is heated at the downward location and undergoes a rise in temperature, convection is generated accompanying rising of the fluid inside the flow path. At this time, if the fluid, which has risen in temperature, comes into contact with the temperature sensor, the temperature sensor also detects the temperature of the fluid rising upward. As a result, a defect is brought about in that the accuracy in detecting the flow velocity or the flow rate of the fluid is lowered.

Thus, in Japanese Laid-Open Utility Model Application Publication No. 06-080130, there has been proposed a mass flow meter in which a pair of temperature sensors are arranged horizontally when the body extends along a vertical direction.

SUMMARY OF THE INVENTION

The mass flow meter disclosed in Japanese Laid-Open Utility Model Application Publication No. 06-080130 tends to be used when arranged in a posture with the body thereof extending along a vertical direction, and the mass flow meter cannot be used when arranged in a posture with the body thereof extending in a horizontal direction. This is because, with such a posture, the aforementioned convection is generated inside the flow path of the mass flow meter.

More specifically, in the mass flow meter according to such a conventional technique, a disadvantage is apparent in that the posture is limited during use of the mass flow meter.

A principal object of the present invention is to provide a thermal type flow sensor, which is capable of evaluating accurately and irrespective of posture the flow velocity or the flow rate of a fluid that flows through a flow path.

According to an embodiment of the present invention, a thermal type flow sensor comprises a temperature sensor disposed on an upstream side, and a heating element disposed on a downstream side of a flow path through which a fluid flows. A heat transfer preventing wall for preventing the fluid, which has risen in temperature due to heat that is generated by the heating element, from coming into contact with the temperature sensor is disposed between the temperature sensor and the heating element.

Fluid that is high in temperature has a specific gravity that is lower than a low temperature fluid. Therefore, in the case that the flow path is arranged in a posture along the vertical direction, with the temperature sensor being positioned vertically upward and the heating element being positioned vertically downward, the fluid, which has undergone a rise in temperature due to the heating element, easily rises toward the side of the temperature sensor. In other words, it is easy for convection to occur.

In the present invention, as noted above, the heat transfer preventing wall is disposed between the temperature sensor and the heating element. By the heat transfer preventing wall, the fluid which has risen in temperature is prevented from contacting the temperature sensor. Further, radiant heat from the heating element is interrupted. Due to this reason, the temperature sensor avoids detecting a temperature other than the temperature of the fluid prior to becoming heated and coming into contact with the temperature sensor.

In this case, it is easy for the temperature sensor to reliably detect the accurate temperature of the fluid prior to being heated by the heating element. Consequently, regardless of the posture of the thermal type flow sensor, the flow velocity or the flow rate of the fluid can be detected accurately. Stated otherwise, there is no limitation on the posture of the thermal type flow sensor.

Also, in this case, since the temperature sensor and the heating element can be arranged on the same axis, a structure can be provided that reduces the size of the thermal type flow sensor.

In certain cases, there is a possibility for the fluid to undergo turbulence under the influence of the heat transfer preventing wall. In order to dispel this concern, preferably, a rectifying means that rectifies a streaming flow of the fluid is disposed on the downstream side of the heat transfer preventing wall and between the temperature sensor and the heating element. By this feature, the fluid obtains a laminar flow, and the fluid is able to flow smoothly downstream to the side of the heating element. Consequently, the fluid which has risen in temperature is more effectively prevented from contacting the temperature sensor. Stated otherwise, the detection accuracy in detecting the flow velocity or the flow rate of the fluid is further enhanced.

An orifice is presented as a preferred detailed example of the rectifying means. In this case, a portion of the flow path may be narrowed.

The rectifying means may be a ventilating element in which a ventilation hole is formed. A structure including a porous member, a mesh, or a honeycomb is presented as a detailed example for this case.

Further, a widthwise dimension of the heat transfer preventing wall, which is perpendicular to a direction of extension of the flow path, preferably is two times or greater than a widthwise dimension of the temperature sensor, which is perpendicular to the direction of extension of the flow path. By this feature, the fluid which has risen is more effectively prevented from contacting the temperature sensor, and radiant heat from the heating element can be more effectively blocked. Stated otherwise, the accuracy in detecting the temperature of the fluid by the temperature sensor is further enhanced.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Below, a preferred embodiment in relation to a thermal type flow sensor according to the present invention will be described in detail with reference to the accompanying drawings.

Figure 1:
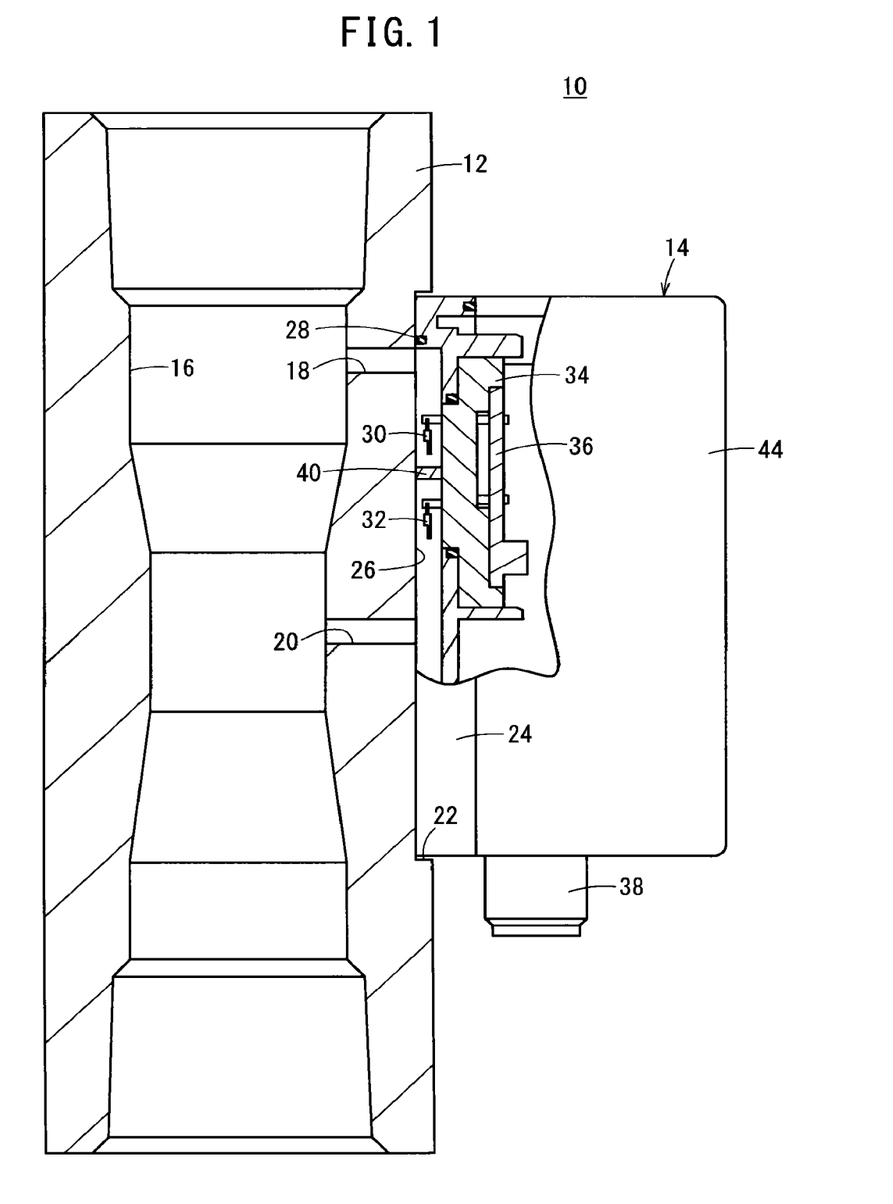
FIG. 1 is a side view partially shown in cross section of a thermal type flow sensor according to an embodiment of the present invention.

FIG. 1 is a side view partially shown in cross section of a thermal type flow sensor 10 according to the present embodiment. The thermal type flow sensor 10 includes a body 12, and a detector 14 retained in the body 12.

To describe the body 12 in outline, the body 12 is constituted from a hollow body in which a main flow path 16 is formed and with both ends thereof open, and having a substantially rectangular parallelepiped shape. Pipe members (none of which are shown) are connected through pipe fittings to the main flow path 16.

As can be understood from FIG. 1, according to the present embodiment, the main flow path 16 extends along a vertical direction. The fluid flows in the interior of the main flow path 16 from a vertical upward direction toward a vertical downward direction. More specifically, the vertical upward direction is on an upstream side of the flow direction, and the vertical downward direction is on a downstream side of the flow direction.

In the pipe members, a forward passage 18 and a return passage 20 are formed that communicate with the main flow path 16. In this case, the forward passage 18 is positioned on the upstream side, and the return passage 20 is positioned on the downstream side.

A recess 22 is formed in one side surface of the body 12. A portion of the detector 14 enters into the recess 22. In addition, a lower surface cover 24 that constitutes the detector 14 abuts against a bottom wall of the recess 22. A measurement flow path 26 that communicates separately with each of the forward passage 18 and the return passage 20 is formed in the lower surface cover 24. Moreover, on the lower surface cover 24, a seal member 28 is disposed in surrounding relation to the measurement flow path 26. By the seal member 28, the site between the body 12 and the detector 14 is sealed.

A temperature sensor 30 and a heater 32 (heating element) are disposed in this order from the upstream side to the downstream side in the measurement flow path 26. More specifically, the temperature sensor 30 is positioned on the upstream side, and the heater 32 is positioned on the downstream side. The temperature sensor 30 and the heater 32 are disposed on a sensor base 34 that is supported on the lower surface cover 24, whereby the temperature sensor 30 and the heater 32 are fixed in position at predetermined locations.

Figure 2:
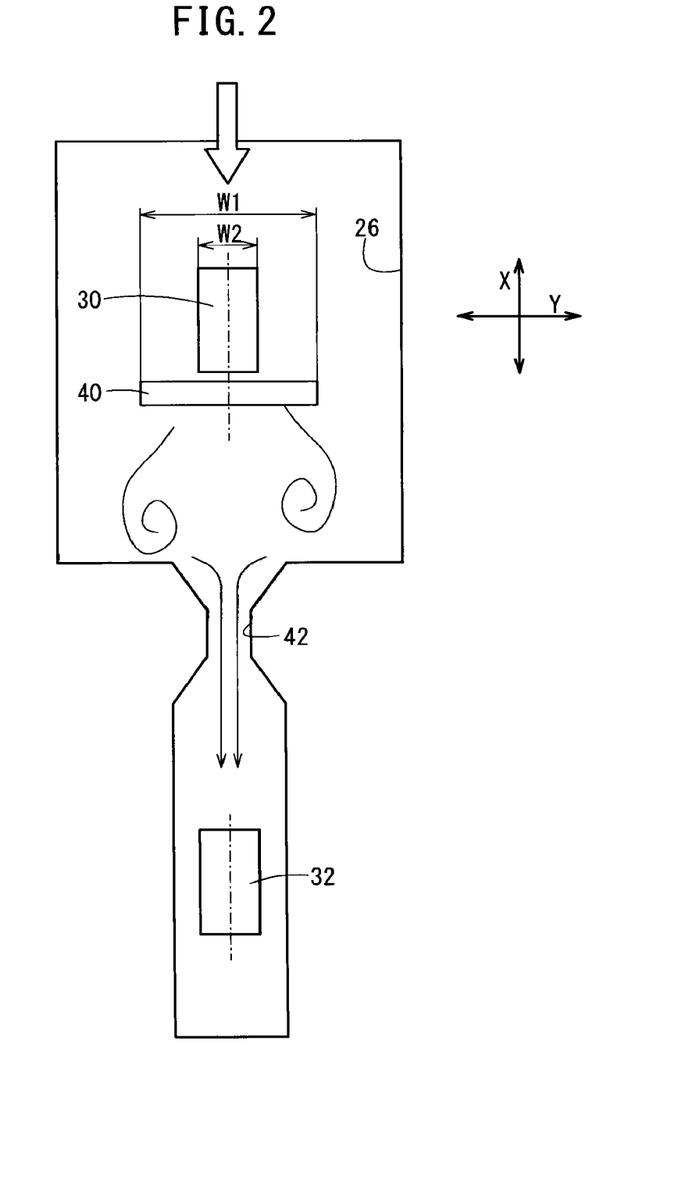
FIG. 2 is a front schematic view of a measurement flow path in the thermal type flow sensor of FIG. 1.

The temperature sensor 30 and the heater 32 are positioned coaxially on the same axial line (see FIG. 2). Consequently, since there is no need to widen the measurement flow path 26, an increase in the size of the detector 14 also is unnecessary.

The sensor base 34 supports a sensor circuit board 36, whereas a non-illustrated control circuit is connected electrically to a connector 38 provided on the detector 14. Through the sensor circuit board 36, a command signal from the control circuit is transmitted to the heater 32, and a signal from the temperature sensor 30 is transmitted to the control circuit.

As shown in FIGS. 1 and 2, a heat transfer preventing wall 40 is disposed between the temperature sensor 30 and the heater 32. The heat transfer preventing wall 40 is positioned directly beneath the temperature sensor 30, or stated otherwise, is arranged in closer proximity to the temperature sensor 30 than the heater 32.

If the Y-direction perpendicular to the X-direction (in this case, the vertical direction), which is the direction of extension of the measurement flow path 26 of the temperature sensor 30 and the heat transfer preventing wall 40, is taken as a widthwise direction, then the widthwise dimension W1 of the heat transfer preventing wall 40 preferably is greater than the widthwise dimension W2 of the temperature sensor 30. In more detail, W1 preferably is two times or greater than W2.

The heat transfer preventing wall 40 is separated from the inner walls of the measurement flow path 26 in the widthwise direction. More specifically, between the heat transfer preventing wall 40 and the inner wall of the measurement flow path 26, a sufficient clearance is formed for enabling flow of the fluid therethrough. Ultimately, by disposing the heat transfer preventing wall 40 in this manner, there is no impediment to flowing of the fluid through the interior of the measurement flow path 26.

As shown in FIG. 2, the measurement flow path 26 is disposed between the temperature sensor 30 and the heater 32, and narrows on a downstream side of the heat transfer preventing wall 40. More specifically, an orifice 42 is formed in the measurement flow path 26. As will be discussed later, the orifice 42 functions as a rectifying means for rectifying a streaming flow of the fluid that flows through the interior of the measurement flow path 26.

A non-illustrated display unit is provided on an upper surface cover 44 that constitutes the detector 14. A flow velocity or a flow rate, which is measured by the detector 14, is displayed on the display unit.

The thermal type flow sensor 10 according to the present embodiment is constructed basically as described above. Next, operations and advantages of the thermal type flow sensor 10 will be described.

As noted above, in the case of the present embodiment, the thermal type flow sensor 10 is used with pipe members being connected to the main flow path 16 of the body 12, and with a posture such that the main flow path 16 and the measurement flow path 26 extend along a vertical direction. At this time, more specifically, the temperature sensor 30 is positioned vertically upward (on the upstream side), and the heater 32 is positioned vertically downward (on the downstream side). Simultaneously, the forward passage 18 that communicates with the main flow path 16 and the measurement flow path 26 is arranged vertically upward (on the upstream side), while the return passage 20 is arranged vertically downward (on the downstream side).

In this condition, under a control action of the control circuit, a command signal to "cause the heater 32 to generate heat" is issued. The heater 32 receives the command signal through the sensor circuit board 36 and generates heat.

When a fluid (e.g., a predetermined compressed gas) is introduced to the pipe members, the fluid flows through the main flow path 16. A portion of the fluid that flows through the main flow path 16 branches off due to the forward passage 18, and enters into the measurement flow path 26 through the forward passage 18. In addition, the temperature of the fluid inside the measurement flow path 26 is measured by the temperature sensor 30. The measurement result is transmitted as a signal to the control circuit.

The fluid in the interior of the measurement flow path 26 flows past the clearance between the heat transfer preventing wall 40 and the inner wall of the measurement flow path 26, flows further downstream therefrom, and comes into contact with the heater 32. Since the heater 32 is heated in advance, the fluid undergoes heating due to the heater 32. By measuring a change in the dissipated heat amount, the control circuit is capable of detecting a change in the flow velocity or the flow rate of the fluid.

The fluid that has come into contact with the heater 32 undergoes a rise in temperature accompanying heat being transmitted from the heater 32. On the other hand, since the fluid on the upstream side from the heater 32 is not heated yet, such fluid is comparatively low in temperature. More specifically, in the interior of the measurement flow path 26, a temperature difference is generated between the fluid in the vicinity of the heater 32 (the fluid after being heated), and the fluid located more upstream than the heater 32. Since the high temperature fluid has a specific gravity that is lower than the low temperature fluid, it is relatively easy for the high temperature fluid to rise in temperature. Therefore, a rising flow of the heated fluid, i.e., convection, occurs, which rises upwardly toward the temperature sensor 30 on the upstream side.

In this case, according to the present embodiment, the heat transfer preventing wall 40 is disposed directly beneath the temperature sensor 30. The fluid, after having been heated in temperature, rises and comes into contact with the heat transfer preventing wall 40. Therefore, the heated fluid is prevented from coming into contact with the temperature sensor 30. Consequently, the temperature sensor 30 is also avoided from detecting the temperature of the heated fluid together with the fluid prior to being heated. Of course, radiant heat from the heater 32 also is interrupted by the heat transfer preventing wall 40.

Assuming that the widthwise dimension W1 of the heat transfer preventing wall 40 is set to two times or greater than the widthwise dimension W2 of the temperature sensor 30, the heated fluid coming into contact with the temperature sensor 30, and radiant heat from the heater 32 reaching the temperature sensor 30, can more effectively be prevented.

More specifically, in this case, the fluid prior to being heated, which is introduced from the forward passage 18, contacts the temperature sensor 30. Further, radiant heat from the heater 32 is prevented from being transmitted to the temperature sensor 30. Due to this reason, the temperature sensor 30 is capable of reliably measuring the accurate temperature of the fluid prior to heating thereof. As a result, the flow velocity or the flow rate of the fluid can be detected accurately.

Figure 3:
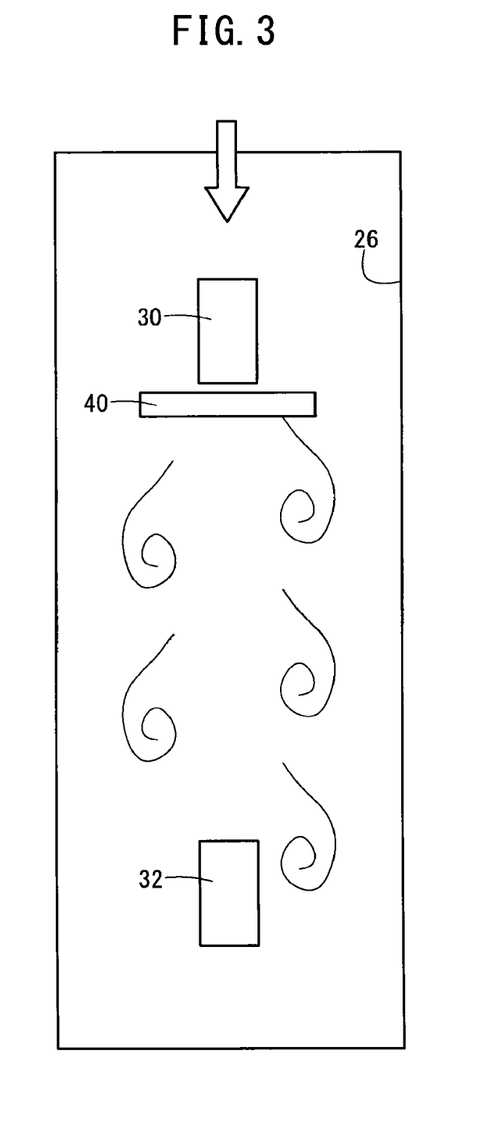
FIG. 3 is a front schematic view of the measurement flow path in a thermal type flow sensor in which an orifice is not formed.

When the rectifying means is not provided, along with providing the heat transfer preventing wall 40, in certain cases, it is possible for a Karman vortex (turbulence) to be generated in the measurement flow path 26 as shown in FIG. 3. However, according to the present embodiment, the orifice 42 is disposed in the measurement flow path 26. Therefore, as shown in FIG. 2, the streaming flow of the fluid is rectified or straightened. In other words, a laminar flow is formed. Consequently, any concerns over generation of turbulence can be dispensed with, and the fluid can be made to flow smoothly to the return passage 20. Such a feature also contributes to an accurate temperature measurement by the temperature sensor 30, and hence to detecting with good accuracy the flow velocity or the flow rate of the fluid.

In Chart 1, there is shown the temperature of the heat that is transmitted to the temperature sensor 30, in respective cases of Model 1, in which neither the heat transfer preventing wall 40 nor the orifice 42 are provided, Model 2, in which only the orifice 42 is provided, and Model 3, in which both the heat transfer preventing wall 40 and the orifice 42 are provided. From Chart 1, it is made clear that transfer of heat to the temperature sensor 30 can be suppressed remarkably by providing the heat transfer preventing wall 40.

Chart 1

| Item | Test Results | | |
| --- | --- | --- | --- |
| | Model 1 | Model 2 | Model 3 |
| Transfer Temperature | 25.0° C. | 19.8° C. | 6.6° C. |
| Transfer Temperature Improvement Rate | N/A | −21% | −71% |

Figure 4:
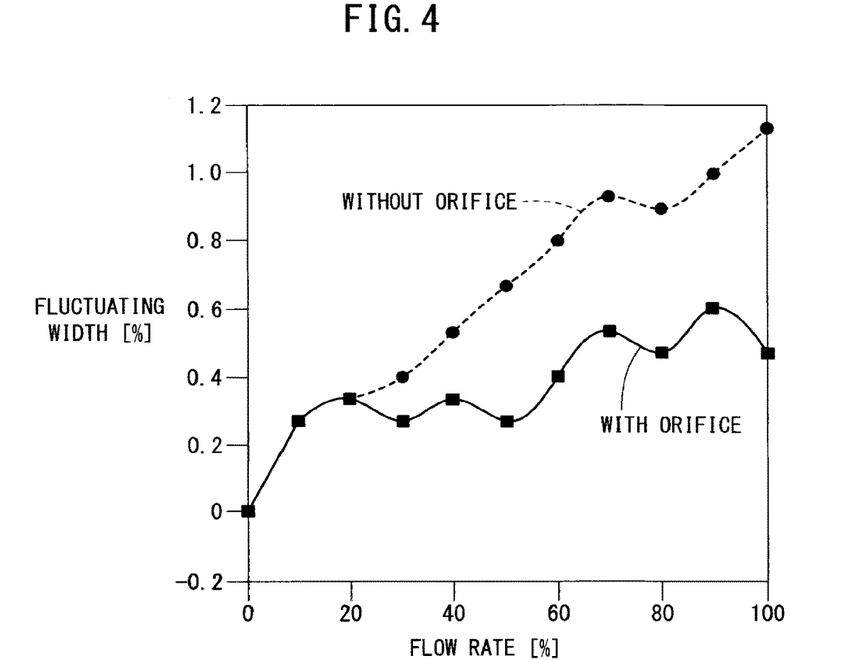
FIG. 4 is a graph showing a fluctuation width of the temperature of the fluid that is measured by a temperature sensor when only a heat transfer preventing wall is provided, and a fluctuation width of the temperature of the fluid that is measured by a temperature sensor when a heat transfer preventing wall and an orifice are both provided.

Further, in the case that only the heat transfer preventing wall 40 is provided (see FIG. 3), or in the case that both the heat transfer preventing wall 40 and the orifice 42 are provided (see FIG. 2), the fluctuation width of the temperature that is measured by the temperature sensor 30 is as shown in FIG. 4. From FIG. 4, it is understood that the fluctuation width of the temperature of the fluid becomes smaller, or stated otherwise, the temperature of the fluid becomes more stable due to the formation of the orifice 42. This is because, by forming the orifice 42, the streaming flow of the fluid in the interior of the measurement flow path 26 is rectified, turbulence is avoided, and the fluid flows as a laminar flow.

As has been described above, according to the present embodiment in which both the heat transfer preventing wall 40 and the orifice 42 are provided in the measurement flow path 26, the main flow path 16 and the measurement flow path 26 extend along the vertical direction, and even in the case that the temperature sensor 30 and the heater 32 are arranged on the same axis, the flow velocity or the flow rate of the fluid can be evaluated accurately. More specifically, an increase in scale of the thermal type flow sensor 10 can be avoided, while at the same time, the accuracy in detecting the flow velocity or the flow rate of the fluid can be improved.

By an operator observing the flow velocity or the flow rate that is displayed on the display unit, the flow velocity or the flow rate can be recognized.

Moreover, the thermal type flow sensor 10 may also be used with a posture in which the main flow path 16 and the measurement flow path 26 extend in a horizontal direction. In this case, since it is difficult or unlikely for convection to occur, the flow velocity or the flow rate of the fluid can be measured with even greater accuracy.

In this manner, regardless of whether the thermal type flow sensor 10 according to the present embodiment is arranged in a posture with the main flow path 16 and the measurement flow path 26 thereof extending in a vertical direction, or is arranged in a posture with the main flow path 16 and the measurement flow path 26 thereof extending in a horizontal direction, the flow velocity or the flow rate of the fluid can be detected highly accurately. Consequently, it is possible for the posture of the thermal type flow sensor 10 to be selected corresponding to the breadth and width of the installation space.

The fluid, after heating thereof, is returned to the main flow path 16 via the return passage 20, and is discharged to the exterior of the thermal type flow sensor 10 through a pipe member.

The present invention is not particularly limited to the above-described embodiment, and various modifications may be made thereto without deviating from the essential gist of the present invention.

For example, if the fluctuation width of the temperature that is measured by the temperature sensor 30 is small, and there is no hindrance to practical use thereof, the thermal type flow sensor 10 may be constituted without providing the orifice 42.

Figure 5:
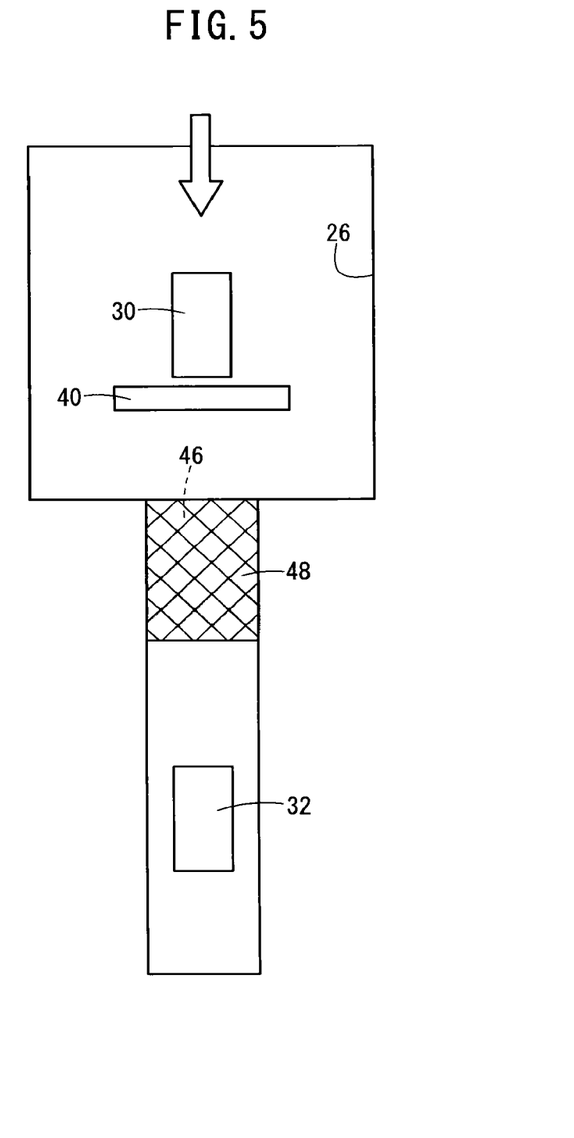
FIG. 5 is a front schematic view of a measurement flow path in the thermal type flow sensor in which a ventilating element is used as a rectifying means.

Further, the rectifying means is not limited to the orifice 42. For example, as shown in FIG. 5, a ventilating element 48 formed with a ventilation hole 46 may be disposed between the temperature sensor 30 and the heater 32. As a detailed example of this type of ventilating element 48, there can be offered a structural member made up from a porous member, a mesh, or a honeycomb.

Figure 6:
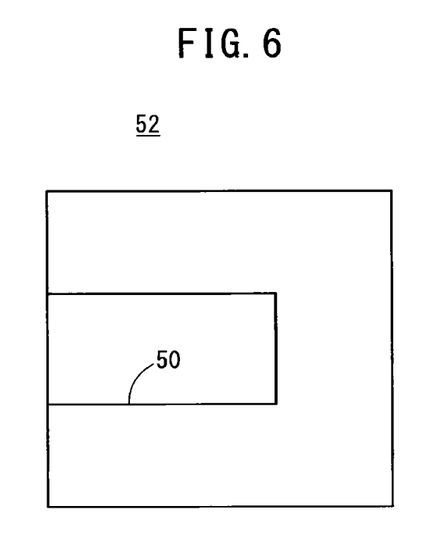
FIG. 6 is a plan view of a heat transfer preventing wall of a different shape from that shown in FIGS. 1 and 2.

Furthermore, the heat transfer preventing wall 40 is not limited to a plate-shaped member. For example, as shown in FIG. 6, a heat transfer preventing wall 52 may be provided in which a surrounding portion 50 is disposed that surrounds the temperature sensor 30. In this case, an advantage is achieved, in that it is more difficult for the fluid after heating thereof to come into contact with the temperature sensor 30, together with the temperature sensor 30 being made less susceptible to the influence of radiant heat from the heater 32.

Figure 7:
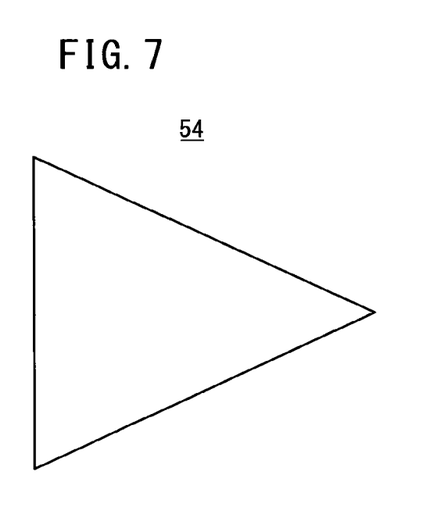
FIG. 7 is a plan view of a heat transfer preventing wall of a different shape from those shown in FIGS. 1, 2 and 6.
Figure 8:
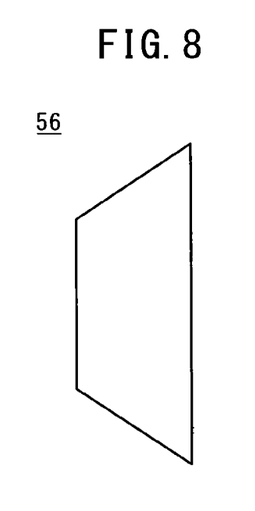
FIG. 8 is a plan view of a heat transfer preventing wall of a different shape from those shown in FIGS. 1, 2, 6 and 7.

Further, a heat transfer preventing wall 54 having a triangular shape in plan view as shown in FIG. 7 may be provided. In this case, a bottom side of the triangular shape may be arranged to face toward the temperature sensor 30, or the apex of the triangular shape may be arranged to face toward the temperature sensor 30. Furthermore, a heat transfer preventing wall 56 having a trapezoidal shape in plan view as shown in FIG. 8 may be provided. In this case, a lower side of the trapezoidal shape may be arranged to face toward the temperature sensor 30, or an upper side of the trapezoidal shape may be arranged to face toward the temperature sensor 30.

Figure 9:
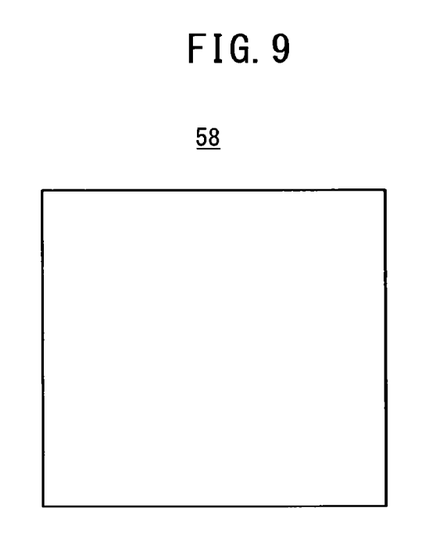
FIG. 9 is a plan view of a heat transfer preventing wall of a different shape from those shown in FIGS. 1, 2, and 6 through 8.
Figure 10:
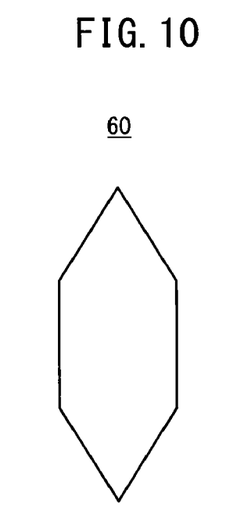
FIG. 10 is a plan view of a heat transfer preventing wall of a different shape from those shown in FIGS. 1, 2, and 6 through 9.
Figure 11:
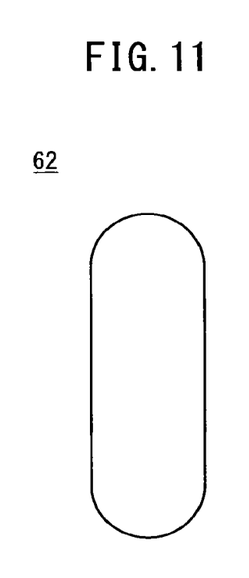
FIG. 11 is a plan view of a heat transfer preventing wall of a different shape from those shown in FIGS. 1, 2, and 6 through 10.

Further, a heat transfer preventing wall 58 having a square shape in plan view as shown in FIG. 9, or a heat transfer preventing wall 60 having a hexagonal shape in plan view as shown in FIG. 10 may be provided. Further, as shown in FIG. 11, a heat transfer preventing wall 62, which is formed with a track shape in plan view, can be adopted.

What is claimed is:

1. A thermal type flow sensor comprising:
   an elongated measurement flow passage separately having a fluid inlet that separates from a main flow path and is provided at an upstream side of the flow passage, and
   a fluid outlet that joins the main flow path and is provided at a downstream side of the flow passage, whereby a fluid entering the measurement flow passage flows in a flow path from the fluid inlet to the fluid outlet;
   a temperature sensor disposed in the measurement flow passage;
   a heater disposed in the measurement flow passage at a location downstream of the temperature sensor and at a location such that fluid flowing in the flow path past the temperature sensor subsequently flows past the heater;
   a heat transfer preventing wall provided between the temperature sensor and the heater for preventing fluid which has risen in temperature due to heat generated by the heater from coming into contact with the temperature sensor, wherein the heat transfer preventing wall is separated from the heater and from the temperature sensor, wherein a widthwise dimension of the heat transfer preventing wall, which is perpendicular to a direction of extension of the flow path, is two times or greater than a widthwise dimension of the temperature sensor, which is perpendicular to the direction of extension of the flow path; and
   an orifice that rectifies a streaming flow of the fluid that has flown past the temperature sensor such that the streaming flow of the fluid reaching the heater is thereby rectified, wherein the orifice is disposed in the flow path on a downstream side of the heat transfer preventing wall and between the temperature sensor and the heater.

2. The thermal type flow sensor according to claim 1, wherein the heat transfer preventing wall includes a surrounding portion that surrounds the temperature sensor.

3. A thermal type flow sensor comprising:
   an elongated measurement flow passage separately having a fluid inlet that separates from a main flow path and is provided at an upstream side of the flow passage, and
   a fluid outlet that joins the main flow path and is provided at a downstream side of the flow passage, whereby a fluid entering the measurement flow passage flows in a flow path from the fluid inlet to the fluid outlet;
a temperature sensor disposed in the measurement flow passage;
a heater disposed in the measurement flow passage at a location downstream of the temperature sensor and at a location such that fluid flowing in the flow path past the temperature sensor subsequently flows past the heater;
a heat transfer preventing wall provided between the temperature sensor and the heater for preventing fluid which has risen in temperature due to heat generated by the heater from coming into contact with the temperature sensor, wherein the heat transfer preventing wall is separated from the heater and from the temperature sensor, wherein a widthwise dimension of the heat transfer preventing wall, which is perpendicular to a direction of extension of the flow path, is two times or greater than a widthwise dimension of the temperature sensor, which is perpendicular to the direction of extension of the flow path; and
a ventilating element in which a ventilation hole is formed, to rectify a streaming flow of the fluid that has flown past the temperature sensor such that the streaming flow of the fluid reaching the heater is thereby rectified, wherein the ventilating element is disposed in the flow path on a downstream side of the heat transfer preventing wall and between the temperature sensor and the heater.

4. The thermal type flow sensor according to claim 3, wherein the ventilating element is a structure including a porous member, a mesh, or a honeycomb.

* * * * *